(12) United States Patent
Fürstenberg

(10) Patent No.: US 11,370,612 B2
(45) Date of Patent: Jun. 28, 2022

(54) TRANSPORT SYSTEM FOR PRODUCTS AND METHOD OF REMOVING A DROPPED PRODUCT

(71) Applicant: SICK AG, Waldkirch (DE)

(72) Inventor: Kay Fürstenberg, Waldkirch (DE)

(73) Assignee: SICK AG, Waldkirch (DE)

( * ) Notice: Subject to any disclaimer, the term of this patent is extended or adjusted under 35 U.S.C. 154(b) by 234 days.

(21) Appl. No.: 16/706,172

(22) Filed: Dec. 6, 2019

(65) Prior Publication Data

US 2020/0180861 A1 Jun. 11, 2020

(30) Foreign Application Priority Data

Dec. 7, 2018 (DE) .......................... 102018131267.9

(51) Int. Cl.
*B65G 1/04* (2006.01)

(52) U.S. Cl.
CPC .................................. *B65G 1/0492* (2013.01)

(58) Field of Classification Search
CPC ................................................... B65G 1/0492
See application file for complete search history.

(56) References Cited

U.S. PATENT DOCUMENTS

| | | | | |
|---|---|---|---|---|
| 9,665,095 B1 * | 5/2017 | Romano | .............. | G05D 1/0246 |
| 9,682,483 B1 * | 6/2017 | Romano | ............. | A47L 11/4066 |
| 9,829,333 B1 * | 11/2017 | Calder | ................... | G08G 1/166 |
| 10,133,276 B1 * | 11/2018 | Shydo, Jr. | ............ | G05D 1/0214 |
| 10,242,273 B1 * | 3/2019 | Eckman | ..................... | G06T 7/75 |
| 2004/0102869 A1 * | 5/2004 | Andersen | ......... | G06K 19/07749 700/215 |
| 2006/0012480 A1 * | 1/2006 | Klowak | ............... | G06K 7/0008 340/572.1 |
| 2007/0282482 A1 * | 12/2007 | Beucher | ................ | G06Q 10/08 700/225 |
| 2009/0072631 A1 * | 3/2009 | Iida | ......................... | F16P 3/144 307/326 |
| 2009/0289791 A1 * | 11/2009 | Onishi | ................... | B25J 9/1676 340/555 |
| 2010/0021272 A1 * | 1/2010 | Ward | ..................... | B65G 57/20 414/137.1 |
| 2010/0061595 A1 * | 3/2010 | Baan | ..................... | G05D 1/0246 382/103 |
| 2011/0295399 A1 * | 12/2011 | Plociennik | ............. | B25J 9/1676 700/97 |
| 2011/0315765 A1 * | 12/2011 | Schantz | ................ | G01S 13/878 235/385 |

(Continued)

FOREIGN PATENT DOCUMENTS

| | | |
|---|---|---|
| DE | 102008017129 A1 | 10/2009 |
| DE | 102010005034 A1 | 7/2011 |
| DE | 102016002603 A1 | 9/2017 |

*Primary Examiner* — Kyle O Logan
(74) *Attorney, Agent, or Firm* — Nath, Goldberg & Meyer; Jerald L. Meyer

(57) ABSTRACT

A transport system for products comprising a plurality of driverless transport units that move in a travel zone not accessible to persons and that do not have a sensor system for a reliable avoidance of accidents with persons. In this respect, at least one driverless transport unit is configured as an escort vehicle that has at least one sensor for a safe detection of sensor data to safely escort a person in the non-accessible travel zone.

16 Claims, 4 Drawing Sheets

(56) References Cited

U.S. PATENT DOCUMENTS

Figure 1:
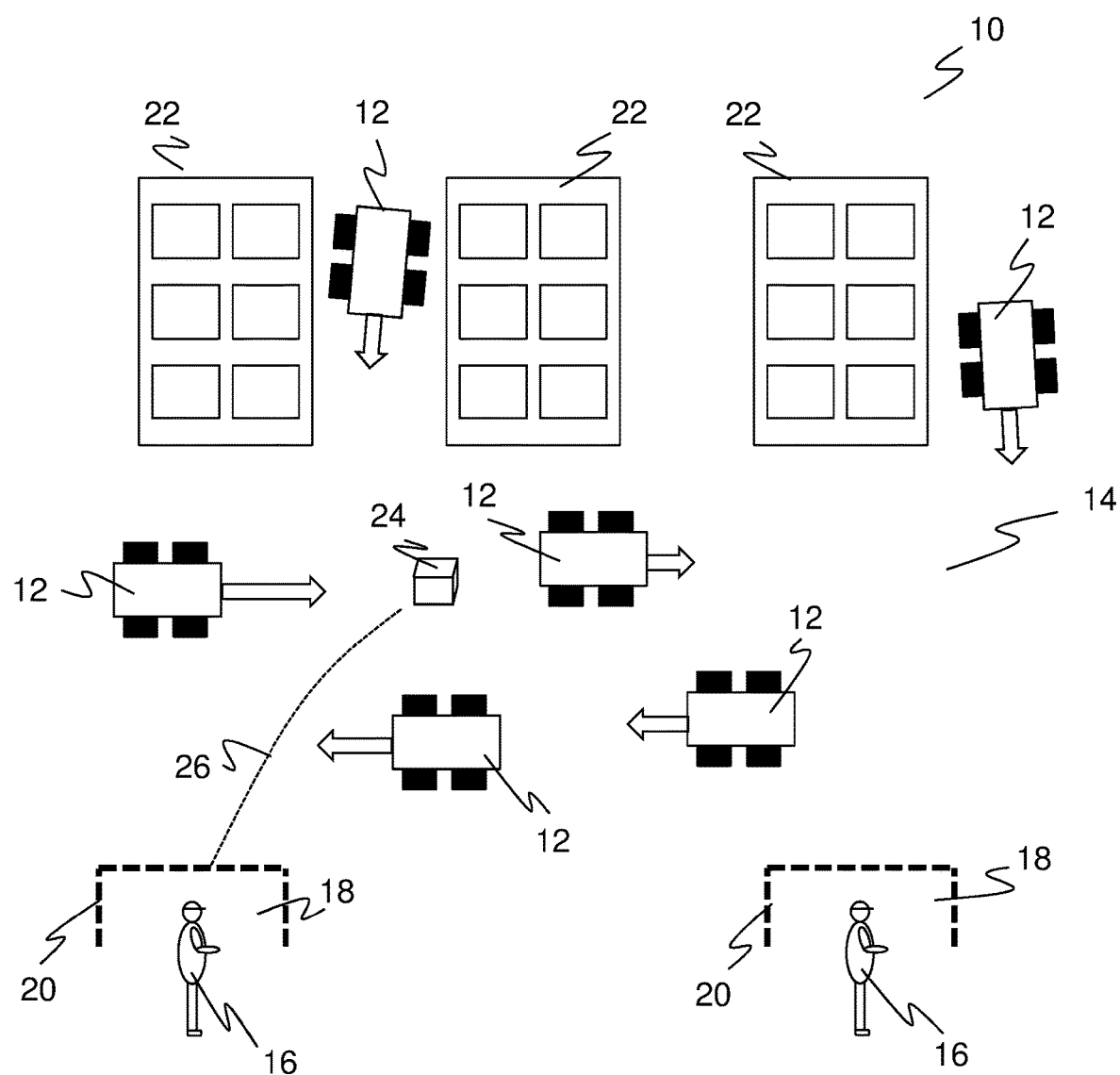

| | | | |
|---|---|---|---|
| 2014/0058556 A1* | 2/2014 | Kawano | G05D 1/0297 700/216 |
| 2016/0026185 A1* | 1/2016 | Smith | G05D 1/0259 356/614 |
| 2016/0132059 A1* | 5/2016 | Mason | G05D 1/0234 701/28 |
| 2016/0171862 A1* | 6/2016 | Das | G05B 9/02 340/686.1 |
| 2016/0271800 A1* | 9/2016 | Stubbs | B25J 9/1666 |
| 2016/0274586 A1* | 9/2016 | Stubbs | G06K 19/07762 |
| 2017/0197313 A1* | 7/2017 | Nishino | A61B 5/02055 |
| 2017/0206723 A1* | 7/2017 | Brunner | F16P 3/147 |
| 2018/0173244 A1* | 6/2018 | Yoon | G06N 3/04 |
| 2018/0181104 A1* | 6/2018 | Stubbs | G05D 1/0234 |
| 2018/0201444 A1* | 7/2018 | Welty | B25J 5/007 |
| 2019/0094876 A1* | 3/2019 | Moore | B65G 1/1373 |
| 2019/0138978 A1* | 5/2019 | Johnson | G06Q 10/08 |
| 2019/0161274 A1* | 5/2019 | Paschall, II | G06Q 10/087 |
| 2019/0196491 A1* | 6/2019 | Balogh | G05D 1/0214 |
| 2021/0205994 A1* | 7/2021 | Dai | G05B 19/41815 |
| 2021/0278850 A1* | 9/2021 | Moore | B60R 21/013 |

* cited by examiner

TRANSPORT SYSTEM FOR PRODUCTS AND METHOD OF REMOVING A DROPPED PRODUCT

The invention relates to a transport system for products and to a method of removing a dropped product or of another object in accordance with the preambles of the respective independent claims.

An increasing proportion of work in logistics applications is automated. Work nevertheless remains that is performed manually. Suitable measures to avoid accidents therefore have to be taken at the interfaces where man and machine come into contact.

The conventional approach is to equip the machines with a safe sensor system that recognizes hazardous situations and initiates the machine being brought into a safe state in good time by evading, by slowing down, or by an emergency stop. Optical sensors such as laser scanners or cameras, including 3D cameras, are in particular suitable for this.

Such sensors used in operator protection and in safety technology have to work particularly reliably and must therefore satisfy high safety demands, for example the EN13849 standard for safety of machinery and the machinery standard IEC61496 or EN61496 for electrosensitive protective equipment (ESPE). To satisfy these safety standards, a series of measures have to be taken such as a safe electronic evaluation by redundant, diverse electronics, functional monitoring or monitoring of the contamination of optical components.

A modern distribution center, for example, uses small driverless transport vehicles (automated guided carts (AGCs) or automated guided vehicles (AGVs)) that transport racks with products between a rack storage space and packers. The packers pick the products from the racks brought to them and pack them into a box.

A possibility of safeguarding the packers now comprises equipping all the AGCs with a safe sensor system. The packers are thereby protected from accidents wherever they are. However, this has two major disadvantages. On the one hand, the required safe sensor system at all the AGCs and the safety solution to be added to them to avoid accidents are extremely complex and/or expensive. In addition, the process is substantially disrupted and delayed by every safeguarding measure.

There are therefore distribution centers in which the travel path around the rack storage spaces and to the packers are exclusively reserved to the AGCs. The packers are protected in a kind of cage and are thus physically separated from the AGCs. There is thus no requirement to secure the AGCs in accordance with the strict measures of the relevant safety standards.

However, it cannot be avoided in everyday work that persons have to leave the protected cage and have to enter the zone actually reserved to the AGCs. The most frequent cause for this is a product that drops to the floor during the transport by the AGCs or during the removal by the packer. This product can only be fetched by a person when it has been ensured that no AGC is traveling in the direct environment. Since the AGCs do not have a safe sensor system, it is necessary as a rule to stop the AGCs over wide surroundings. This in turn results in expensive downtimes.

U.S. Pat. No. 9,682,483 B1 in this connection relates to a system for removing debris on a warehouse floor. In this process, a cleaning vehicle is equipped with a robot arm that is able to pick up objects from the floor. In addition to the costs, it is disadvantageous here that at least initially a human is still much superior to a robot in his flexible abilities of resolving the most varied conceivable situations after a dropping of an object.

It is therefore the object of the invention to provide a transport system that permits a response to unforeseen event with measures that are as simple as possible.

This object is satisfied by a transport system for products and by a method of removing a dropped product or of another object in accordance with the respective independent claim. A plurality of driverless transport units, in particular AGCs, move to pick up, transport, and provide or place down the products in a travel zone that is blocked for or not accessible to persons in regular operation. Due to the exclusive assignment of the travel zone for the driverless transport units, it is not necessary to take measures to avoid accidents with persons. The driverless transport units therefore do not have a safe sensor system in the sense of the standards named in the introduction or of comparable standards. Simpler sensor systems and control measures to avoid collisions of the driverless transport units are preferably nevertheless made use of, but this only relates to damage to property and these measures therefore do not reach the complex level that is required for operator protection.

The invention starts from the basic idea of upgrading at least one driverless transport unit to a safe escort vehicle. The escort vehicle is monitored for this purpose by at least one sensor for a safe detection of sensor data. This safe sensor is preferably attached to the escort vehicle. It is, however, also conceivable to at least partially monitor the environment of the transport system, that is the warehouse hall, for example, with safe sensors that replace or complement the safe sensor at the escort vehicle. The demands on the detection of the sensor data using the safe sensor correspond to the strict safety standards. Unlike the other driverless transport units, the high safety level of accident prevention for persons is therefore required for the escort vehicle alone or in combination with the higher-ranking control and safe sensors connected thereto.

The escort vehicle safely escorts a person in the otherwise inaccessible travel zone. As long as the escort vehicle is present and safety is ensured, a person may therefore exceptionally enter the travel zone to manually take a measure there which the driverless transport could not do themselves. This is in particular the remedying of a situation that hinders the operation of the driverless transport units in the travel zone. The escort vehicle preferably remains in the vicinity of the person. The required proximity here depends on the radius over which the escort vehicle can provide safety for the person, which is in turn inter alia determined by the performance of the sensor.

The invention has the advantage that a particularly smooth routine is ensured in the travel zone and thus a high efficiency of the transport. The elimination of a disruption in the travel zone can take place fast and simply by a person. His safety is ensured very inexpensively since only the escort vehicle and not, for instance, all the driverless transport units are subject to the high safety standards. It is not necessary to switch off the driverless transport units during the presence of the person in the travel zone; the product transport can be continued largely without disruption. The escort vehicle or a higher-ranking control only blocks the actually required direct environment of the person for the other driverless transport units that can continue to travel as soon as the person and the escort vehicle have moved on accordingly.

At least one work zone in which a person is present to take over a product from a driverless transport unit or to transfer it to the driverless transport unit is preferably adjacent to the travel zone. The work zone is clearly separated from the travel zone and can therefore be protected relatively simply, for example by barriers or similar mechanical safeguards. Unsecured driverless transport units therefore do not come into contact with persons; they necessarily maintain a certain distance. The barrier is, however, naturally open for the product transfer.

The escort vehicle is preferably configured to escort a person to a specified position in the travel zone. The escort vehicle thus enables a person to reach a position at which a manual measure is necessary. The person is preferably escorted by the escort vehicle during the whole time in the travel zone, that is also on the way to possible further specified positions and on the return path.

A dropped product or another object to be removed is preferably reachable at the specified position. A dropped product is a situation that occurs relatively frequently and in which a manual intervention in the automatic operation is required in the travel zone. The dropped product is not only at risk of being destroyed; it can above all disrupt the operation of the driverless transport units. The person is safely escorted to the dropped product, picks it up, and takes it to the work zone or transfers it to the escort vehicle or to another driverless transport vehicle. Other objects that can be removed in this manner are also conceivable, in particular a defective transport vehicle.

The specified position is preferably fixed by the escort vehicle or by a higher ranking control of the transport system. In this case, the escort vehicle so to say drives at the front, with it physically equally being able to remain next to or behind the person and with it at least knowing the destination and defining the path for the person. For example, one of the driverless transport vehicles, in particular the escort vehicle preferably equipped in accordance with the invention with a better sensor system or a camera observing the travel zone, notices a dropped product or another disruptive object. The higher ranking control now requests a person to pick the product up and sends the escort vehicle to him.

The specified position is preferably fixed by the person. The initiative to enter the travel zone can here be selectively taken by the transport system or by the person himself. The person indicates the specified position, for example via a keyboard or on a map of the travel zone, or he enters the travel zone after a corresponding release of the transport system and walks to the specified position while the escort vehicle moves with him and secures the path. The person also preferably follows the escort vehicle in this case provided it is aware of the destination.

The escort vehicle is preferably configured to collect the person at a work zone adjacent to the travel zone or at an access zone to the travel zone. The escort vehicle comes at the request of the person or is sent there by the transport system. It is conceivable that the escort vehicle exceptionally also partially travels into the work zone that is otherwise blocked for the transport units to collect and return the person. Alternatively to a collection from the work zone that requires a temporary opening of the mechanical safeguard there, a separate access zone to the work zone is conceivable to which the person moves outside the travel zone to be collected by the escort vehicle.

The escort vehicle preferably has a transport device to transport the person in the inaccessible travel zone. The person therefore does not move independently within the travel zone, but is rather transported by the escort vehicle. This inter alia permits a certain mechanical protection of the person within the escort vehicle, directly ensures that the person does not move away from the escort vehicle in a hazardous manner, and shortens his presence, in particular in the case of longer distances.

The sensor is preferably configured to localize the escort vehicle in the travel zone. This information is preferably forwarded to a control center or to a higher ranking control. The transport system therefore has a knowledge of the respective location of the escort vehicle that is reliable in the sense of safety standards. The driverless transport units can thus temporarily avoid the required environment around the escort vehicle in a very direct manner, and can travel very slowly there or stop in order not to endanger the escorted person and to nevertheless maintain normal operation outside this direct environment.

The sensor is preferably configured to safely detect the escorted person. Contactless sensors such as optical sensors are suitable for this, but also a switch or a contact sensor via which the person has to maintain constant physical contact with the escort vehicle. The actual environment of the person can thereby be protected from the driverless transport units whereas otherwise a still rather generously dimensioned radius of the escort vehicle would have to be taken into account.

The sensor is preferably configured to monitor a maximum distance of the escorted person from the escort vehicle. The escort vehicle can thus best ensure the safety of said person. The still permitted distance of the person from the escort vehicle depends on the safeguarding concept.

A plurality of driverless transport units preferably together secure the path of the person in the travel zone. The escort vehicle and/or a higher ranking control of the transport system coordinate these driverless transport units. It is conceivable, but not necessary, that the driverless transport units recruited for the common safeguarding are equipped with a safe sensor system like the escort vehicle.

The plurality of driverless transport units preferably form a corridor. The person moves in the corridor protected from further driverless transport units that would anyway avoid a collision with the driverless transport units forming the corridor in the normal routine and would be physically prevented from doing so if necessary. The corridor can cover the total path of the person through the travel zone, for instance from a work zone or access zone up to a dropped product or in each case only a partial portion of the path in a current environment of the person. Such a partial portion then preferably moves along with the person.

The method in accordance with the invention can be further developed in a similar manner and shows similar advantages in so doing. Such advantageous features are described in an exemplary, but not exclusive manner in the subordinate claims dependent on the independent claims.

Figure 2:
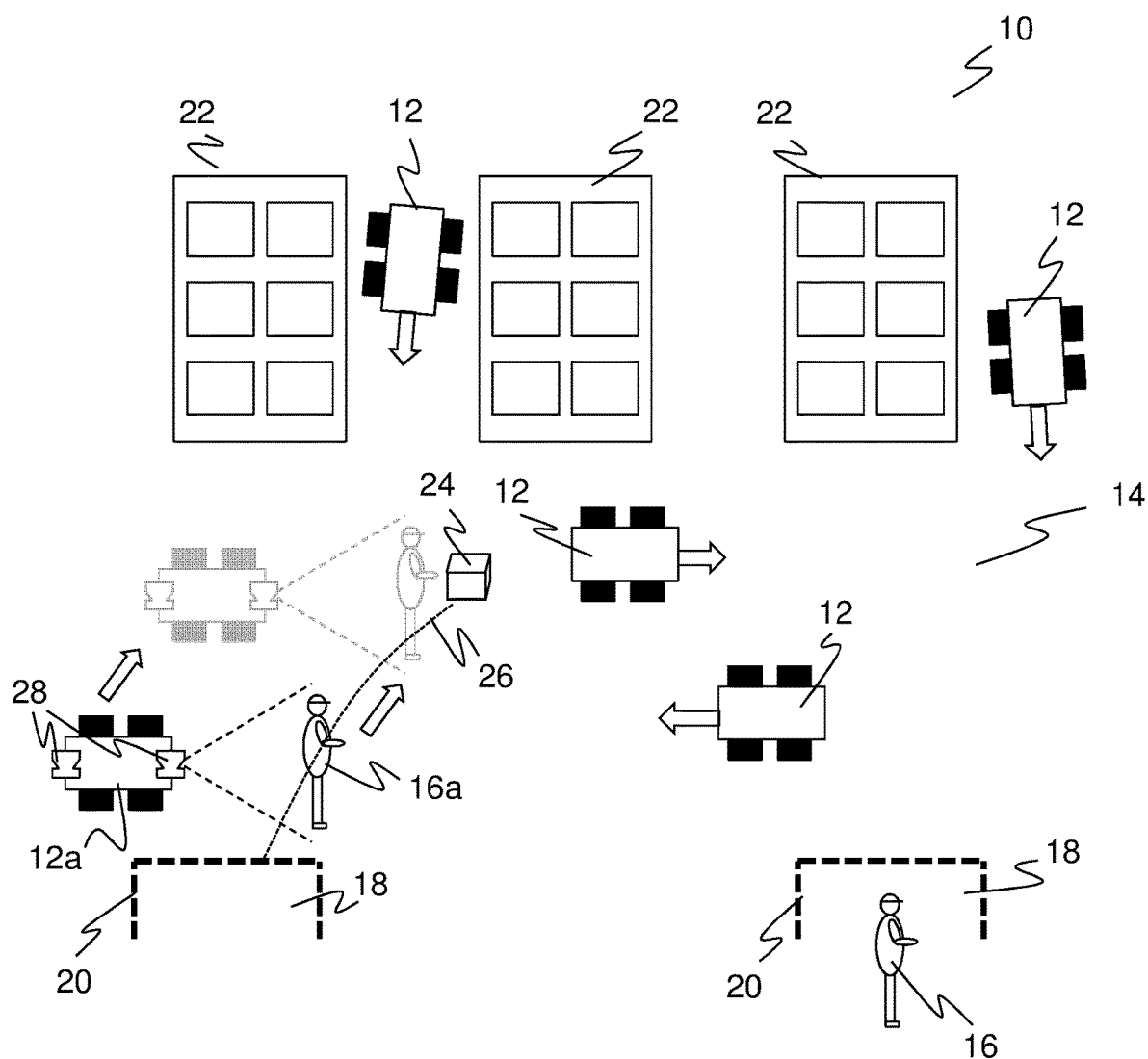
Figure 3:
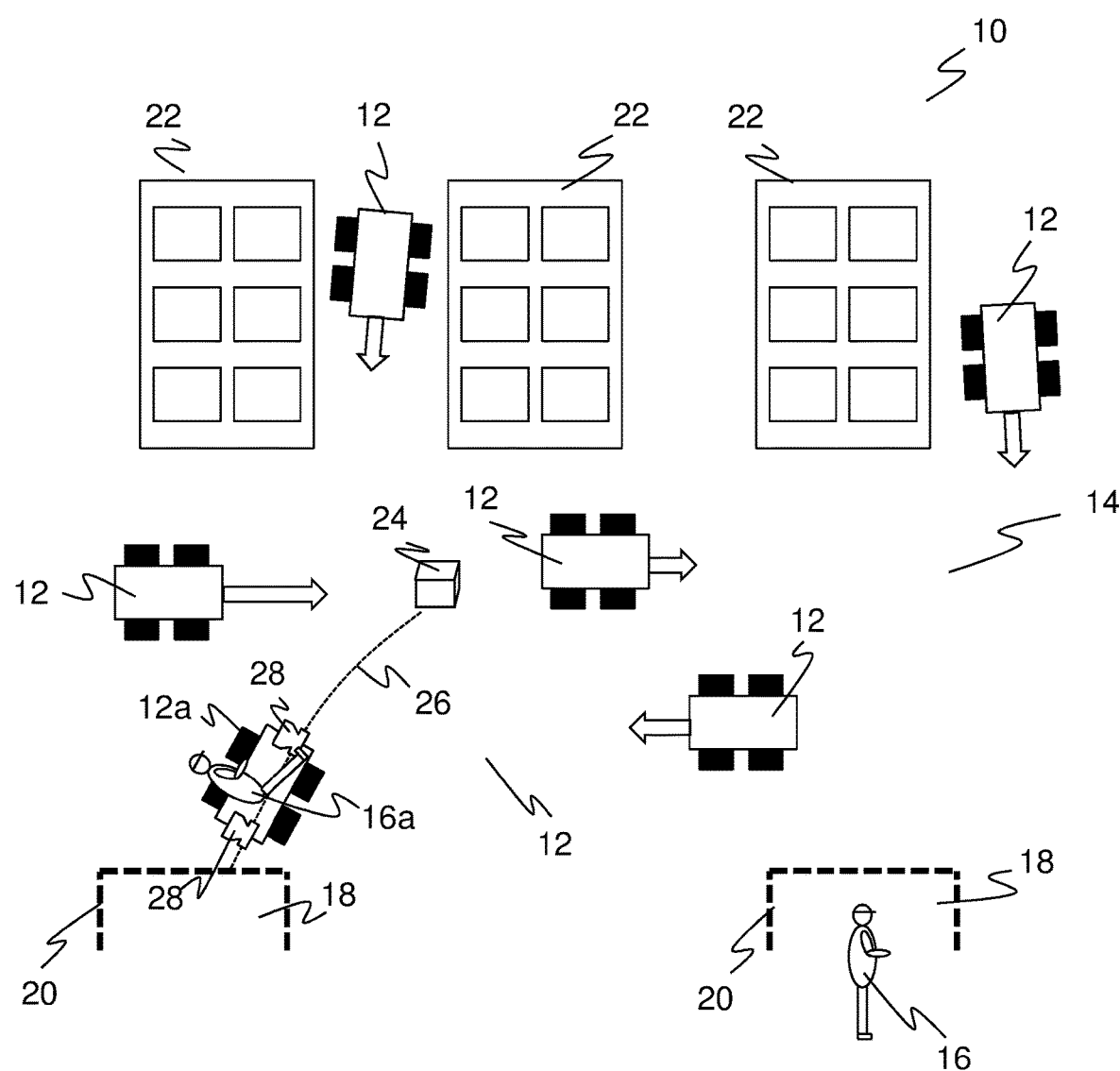
Figure 4:
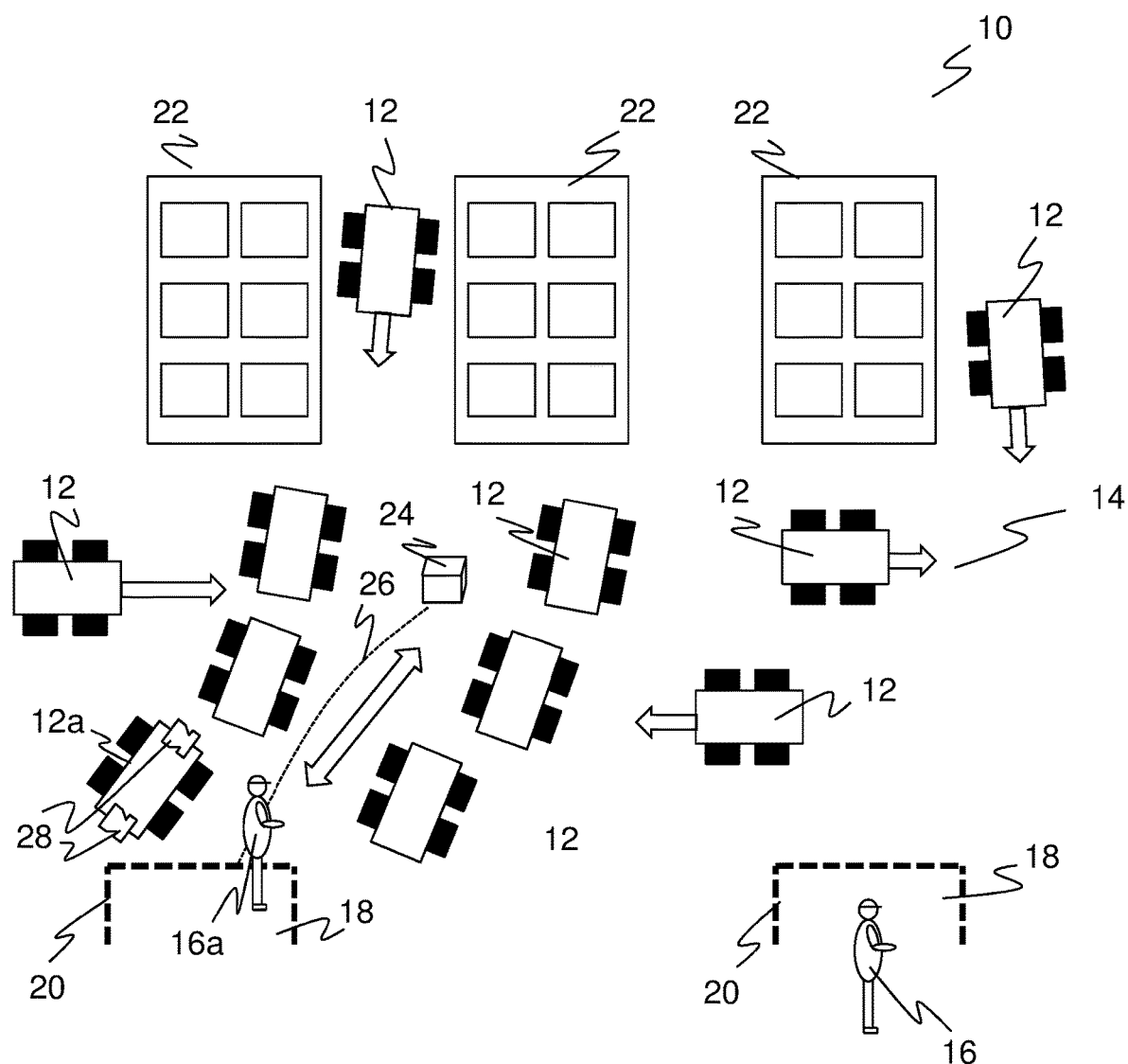

The invention will be explained in more detail in the following also with respect to further features and advantages by way of example with reference to embodiments and to the enclosed drawing. The Figures of the drawing show in:

FIG. 1 an overview representation of a transport system comprising a plurality of driverless transport units, their exclusive travel zone, and adjacent work zones for persons, and a dropped package that should be collected from the travel zone by a person;

FIG. 2 an overview representation similar to FIG. 1 with an escort vehicle that safely escorts the person to the dropped package;

FIG. 3 an overview representation similar to FIG. 1 with an escort vehicle that transports the person to the dropped package; and FIG. 4 an overview representation similar to FIG. 1 in which a plurality of transport units form a safe corridor in which a person moves to the dropped package.

FIG. 1 shows a transport unit 10 in an overview representation The transport system 10 is used in logistics automation or factory automation and conveys objects that are called products here. Examples for the use are warehouses, distribution centers, mail distribution centers, or baggage handling at airports.

A plurality of driverless transport units 12, transport vehicles, or robots (e.g. automated guided containers (AGCs) or automated guided vehicles (AGVs) take over the transport of the products. The driverless transport units 12 are connected to one another and/or to a higher ranking control, not shown, or to a control center to coordinate the processes. The control center can also take over the control of the driverless transport units 12. The driverless transport units 12 can, however, also particularly work at least partly autonomously for local decisions such as the acceleration, deceleration, evasion, pick-up, transfer, and placement of products, the localization of the suitable path, and the like.

The travel zone 14 in which the driverless transport units 12 move is preferably exclusively provided for the driverless transport units 12 and further machines. Persons are not permitted there in regular operation. Persons 16 are rather accommodated in separate work zones 18 that are adjacent to the travel zone and that are preferably separated from the travel zone 14 by mechanical safeguards 20. The driverless transport units 12 move products from racks 22 in the travel zone 14 to the persons 16 at their work zones 18. Alternatively, the transport units 12 convey whole racks or rack parts having a plurality of products for selection from rack placement positions to the work zones 18. The persons 16 reach over or through the mechanical safeguard 20 to take up products from the driverless transport units 12 or to transfer them to the driverless transport units 12.

Due to the clear spatial separation of the travel zone 14 and the work zone 18 and the mechanical safeguard 20, it is not necessary that the driverless transport units 12 are safe in the sense of relevant standards for operator safety. They nevertheless typically have sensors to evade one another and other obstacles in good time or to brake. The error tolerance is, however, significantly higher because there is only the risk of property damage and downtimes and not, for instance, injuries to persons.

However, situations occur over and over again in which a manual intervention in the travel zone by persons 16 would nevertheless be desirable. This relates to driverless transport units 12 that have broken down or to their servicing, to work at the racks 22, and particularly often to dropped products 24 that are used as examples below. If a person 16 is to pick up the product 24 and to collect it from the travel zone 14 or to transfer it to a driverless transport units 12, the path 26 through the travel zone 14 to the product 24 must be secured. Since, however, the driverless transport units 12 do not have a safe sensor system, there is only the possibility without additional measures of stopping the driverless transport units 12 in a wide-ranging environment or even in the whole travel zone 14 or to cause them to drive so slowly that an accident would not cause any serious damage.

FIG. 2 shows a further overview representation of a transport system 10. To enable a person 16a to enter into the path 26 without risk and to pick up the dropped product 24, a driverless transport unit is used that is equipped as an escort vehicle 12a.

The escort vehicle 12a for this purpose has at least one sensor 28 that generates safe sensor data. Safe means that a defined safety level in the sense of the standards named in the introduction or of comparable standards is reached. For this purpose, the sensor 28 can itself be a safe sensor, for example by self-tests, redundant components and measurement processes, and the like or, alternatively, a combination of sensors 28 is used that provides safe sensor data by mutual tests or plausibility checks.

Suitable sensors 26 are, for example, optoelectronic sensors such as laser scanners or cameras, including 3D cameras. Other sensors are, however, also conceivable as a diverse addition or as an alternative such as ultrasound sensors, inductive, magnetic, or capacitive sensors, or radar. A further alternative is a contact sensor or a switch with which the person 16a has to maintain physical contact to ensure that he is directly at the escort vehicle 12a. The sensor system for security does not, however, to be provided by, or at least not solely by, the escort vehicle 12a It is also conceivable to monitor the environment of the transport system 10, i.e. in particular the travel paths, by at least one safe sensor that is not attached to the escort vehicle 12a and is in particularly fixedly mounted. Safe sensors can therefore only be provided at the escort vehicle 12a, only in the infrastructure or as part of the transport system 10, or in a combination of the two. The embodiment will be described as representative in the following that is based only on safe sensors 28 of the escort vehicle 12a.

The possible tasks of the sensors 28 include the safe localization of the escort vehicle 12a itself and the safe detection of the person 16a in an environment of the escort vehicle 12a. The escort vehicle 12a or the higher ranking control connected to the escort vehicle 12a thereby knows the zone to be protected in which the driverless transport units 12 have to take account of the person 16a. Driverless transport units 12 may not move or may only move slowly in the zone to be protected. Operation can be continued without disruption everywhere else despite the presence of a person 16 in the travel zone 14.

The escort vehicle 12a travels on request of the person 16a or at the instigation of the higher ranking control of the transport system 10 to a location at the margin of the travel zone 14. In FIG. 2, this is a position close to the work zone 18; alternatively, there could also be specified safe access ones into the travel zone 14. The person 16a is safely detected from the safe transition from the work zone 18 onward into the travel zone 14 by the sensors 28 of the escort vehicle 12a. FIG. 2 shows a position of the person 16a and of the escort vehicle 12a directly after entering the travel zone 14 and hatched and at a later time after the person 16a and the escort vehicle 12a have moved into the proximity of the dropped product 24.

The escort vehicle 12a escorts the person 16a on the path 26 to the dropped product 24 and back. The higher ranking control of the transport system 10 thereby knows over the total presence of the person 16a in the travel zone 14 where the driverless transport units 12 may currently move or may only move slowly or only in a direction away from the person 16a. It is also conceivable that the sensors 28 recognize objects in the environment of the person 16a, in particular driverless transport units 12, that nevertheless move toward the person 16a or come too close to the person 16a due to a faulty control and for which then a safety-relevant response is immediately initiated, for example an emergency stop via the higher ranking control for the total transport system 10 or at least for the zone in an environment of the escort vehicle 12a and/or of the person 16a. The person 16a is thus protected and can collect the dropped product 24 from the travel zone 14 or optionally also place it on the escort vehicle 12 or on another driverless transport unit 12.

The escort vehicle 12a can in principle be of the same design as the other driverless transport units 12, with the difference that it becomes a safe escort for the person 16a with the aid of the sensors 28. It is, however, in no way absolutely necessary that the driverless transport units 12 are of the same design among one another and the escort vehicle 12a can accordingly also have a different design. If the escort vehicle 12a is not needed as an escort, it can transport goods with the other driverless transport units 12 or can wait separately until it is needed.

FIG. 3 shows a further overview representation of a transport system 10. In this embodiment, the escort vehicle 12a is additionally equipped with a transport device, not shown, for persons. The escort vehicle 12a can thus safely travel the person 16a to the dropped product 24 and back. The person 16a alights there to pick up the dropped product 24 and is secured by the escort vehicle 12a in the meantime. Alternatively, it is possible in many cases that the person 16a picks up the dropped product 24 from the escort vehicle 12a.

FIG. 4 shows a further overview representation of a transport system 10. It is an example for the possibility that one or more driverless transport units 12 cooperate to secure the path 26 of the person 16a to the dropped product 24. Driverless transport units 12 form a corridor for this purpose. The escort vehicle 12a participates in forming the corridor or travels together with the person 16a through the corridor. It anyway preferably satisfies the task of ensuring with the aid of its sensors 28 that the person 16a is actually in the corridor. It is conceivable to equip a plurality of driverless transport units 12 and not only a single escort vehicle 12a with sensors 28 to detect the person 16a in the corridor. The higher ranking control ensures that no further driverless transport units 12 travel in an environment of the person 16a or even of the corridor. FIG. 4 shows a corridor that includes the complete path 26 to the dropped product 24. It is also conceivable to form a corridor only for that respective partial portion of the path 26 in which the person 16a is currently present. The driverless transport units 12 that form the corridor portion then preferably move with and flank the person 16a.

As a further alternative, not shown, a driverless transport unit can be equipped with a robot arm by which the dropped product 24 is picked up. No person 16 then has to enter into the travel zone 14.

The invention claimed is:

1. A transport system for products, the transport system comprising:
    a plurality of driverless transport units that move in a travel zone not accessible to persons and that do not have a sensor system for a reliable avoidance of accidents with persons,
    at least one sensor for monitoring the plurality of driverless transport units; and
    a controller in communication with the at least one sensor, wherein at least one of the driverless transport units is configured as an escort vehicle to safely escort a person in the non-accessible travel zone, wherein the at least one of the driverless transport units is further configured to prevent an accident between the person and other ones of the plurality of driverless transport units when the person is within the non-accessible travel zone and is accompanied by the at least one of the driverless transport units, and wherein the controller controls movement of the plurality of driverless transport units to prevent accidents based on the monitoring thereof, the controller preventing or slowing movement of the plurality of driverless transport units within an established zone around the escort vehicle and the person.

2. The transport system in accordance with claim 1, wherein the escort vehicle includes the at least one sensor for a safe detection of sensor data.

3. The transport system in accordance with claim 1, wherein at least one work zone in which a person is present to take over a product from a driverless transport unit or to transfer it to the driverless transport unit is adjacent to the travel zone.

4. The transport system in accordance with claim 1, wherein the escort vehicle is configured to escort a person to a specified position in the travel zone.

5. The transport system in accordance with claim 4, wherein a dropped product or another object to be removed is reachable at the specified position.

6. The transport system in accordance with claim 4, wherein the specified position is fixed by one of the escort vehicle and a higher ranking control of the transport system, the higher ranking control being associated with the controller.

7. The transport system in accordance with claim 4, wherein the specified position is fixed by the person.

8. The transport system in accordance with claim 1, wherein the escort vehicle is configured to collect the person at a work zone adjacent to the travel zone or at an access zone to the travel zone.

9. The transport system in accordance with claim 1, wherein the escort vehicle has a transport device to transport the person in the inaccessible travel zone.

10. The transport system in accordance with claim 1, wherein the at least one sensor is configured to localize the escort vehicle in the travel zone.

11. The transport system in accordance with claim 1, wherein the at least one sensor is configured to safely detect the escorted person.

12. The transport system in accordance with claim 1, wherein the at least one sensor is configured to monitor a maximum distance of the escorted person from the escort vehicle.

13. The transport system in accordance with claim 1, wherein a plurality of driverless transport units together secure the path of the person in the travel zone.

14. The transport system in accordance with claim 13, wherein the plurality of driverless transport units form a corridor.

15. A method of removing an object from a travel zone which is not accessible to a person and in which a plurality of driverless transport units move, the plurality of driverless transport units not having sensor systems for reliable avoidance of accidents with persons, the method comprising:
    at least one driverless transport unit safely escorting a person in the non-accessible travel zone as an escort vehicle;
    monitoring at least one of a position and an environment of the escort vehicle and the person, wherein the monitoring is performed by at least one sensor and further comprises monitoring the plurality of driverless transport units; and
    preventing an accident between the person and other ones of the plurality of driverless transport units when the person is within the non-accessible travel zone and is accompanied by the at least one of the driverless transport units, wherein the preventing of the accident comprises a controller controlling movement of the plurality of driverless transport units, the controller being in communication with the at least one sensor, the controller preventing or slowing movement of the plurality of driverless transport units within an established zone around the escort vehicle and the person.

16. The method according to claim 15, wherein the escort vehicle includes the at least one sensor.

\* \* \* \* \*